Sept. 27, 1966 J. GROSVALET 3,275,908

FIELD-EFFECT TRANSISTOR DEVICES

Filed March 8, 1963

Inventor
Jean Grosvalet
By Cushman, Darby & Cushman
Attorneys

United States Patent Office 3,275,908
Patented Sept. 27, 1966

3,275,908
FIELD-EFFECT TRANSISTOR DEVICES

Jean Grosvalet, Paris, France, assignor to CSF-Compagnie Generale de Telegraphie Sans Fil, a corporation of France Filed Mar. 8, 1963, Ser. No. 263,916
Claims priority, application France, Mar. 12, 1962, 890,695
3 Claims. (Cl. 317—235)

The present invention relates to field-effect transistors, i.e. transistors, wherein the electric charge carriers propagate, within a semi-conductor body, from a source to a drain, not through a diffusion process, but under the action of an electric field generated by applying a potential difference between the source and the drain.

A conveniently biased control gate produces a space charge which defines a path for the passage of the carriers. The cross-section of the passage available for the current flow thus depends upon the gate voltage. The arrangement presents properties similar to those of a pentode.

This is, however, true only when certain structural conditions are satisfied and it is an object of the invention to provide a field effect transistor wherein this is the case.

The invention will be best understood from the following description and appended drawing wherein.

The structure shown diagrammatically in FIG. 1 comprises a semi-conductor body 1, a circular ohmic contact 3, an annular electrode 4 to be described later in this specification, which surrounds contact 3, and an annular electrode 5 arranged on the face of body 1, opposite to that carrying electrode 4 coaxially with the latter.

Figure 1:
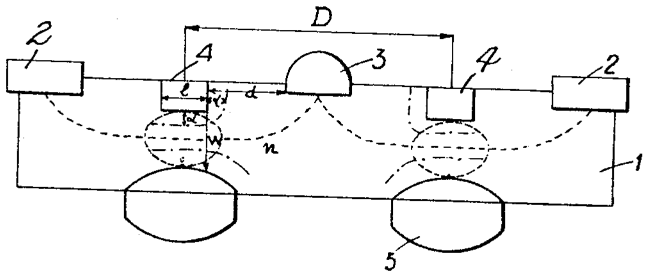
FIG. 1 is a diagrammatic view of a field-effect transistor according to the invention.

The structure shown in FIG. 1 is of a generally known type: the ohmic contacts 2 and 3 act as the source and the drain respectively and the carriers propagate along the path shown in dotted line between these electrodes. The gates, which are built up by electrodes 4 and 5 and are connected to the same source, produce space charges defining a path shown in dashed lines. As is well known, gates 4 and 5 may be also used separately. In fact, one of them, the larger one 5, serves as the bias grid, and also, due to its large surface of contact with body 1, serves to evacuate heat. The smaller one 4, serves as a high frequency control grid and is the only one which needs to be suitably designed for best performances in so far as frequency is concerned.

The bias voltages are applied in a normal manner.

According to an essential feature of the invention, the portion of the semiconductor body 1, bounded by the control grids or gates 4 and 5, i.e. in FIG. 1 the region indicated in dotted line by a closed curve between electrodes 4 and 5, has a cross-section (i.e. a section through a plane substantially perpendicular to the path followed by the carriers), which is smaller than that of the adjoining portion of the semi-conductor body, this contraction being abrupt. Thus, the cross-section of that portion of semi-conductor body 1, which is uniformly of a certain type of conductivity, is restricted in an abrupt manner due to the presence of the gate regions which are, for example, of the opposite type of conductivity and, in any case, present a difference in nature from the remainder of the semi-conductor body.

This sudden restriction of the cross-section of the main semi-conductor body is a structural condition which has not been mentioned up to the present: the applicant has found it to be necessary for the field-effect transistor to operate correctly. This finding has coincided with an advance in the understanding of this operation as achieved by the applicant.

It is known that the useful portion of the source-drain potential difference versus current characteristic of a field effect transistor corresponds to the saturation region, where the current remains substantially constant for an increasing potential difference.

This saturation effect, according to the applicant's views, cannot be assuredly obtained unless in the region where the field-effect appears, the carriers have reached their limit speed, and the cross-section of the path they follow is substantially constant for a given value of the gate voltage.

According to the applicant's theory, a region must exist in the main semi-conductor body portion, where prevails an electric field which is at least equal to the critical field, i.e. the field for which the carriers reach their limit speed; on the other hand, in the region where the field reaches this critical value, the cross-section of the path followed by the carriers must be substantially constant.

The first of these requirements implies a very sudden change in the field when entering the active region of the semi-conductor body, i.e. the already defined region bound by the gates.

According to the invention, this abrupt modification of the field is achieved by an abrupt restriction of the main polarity portion of the semi-conductor. Different methods for achieving this restriction will be hereinafter described.

It should be noted that the above considerations imply such conditions of size and shape of the structure, that the electric field prevailing therein should reach the critical value precisely in a region where the space charges about the gates define a passage, whose cross section is substantially constant for a given gate voltage but varies to a high degree as a function of said gate voltage.

According to the applicant's views the space charge of a width $\alpha$ which surrounds the gate should never come in contact with the central electrode 3, which implies the stringent requirement that $$d>w/2$$

where $d$ is the spacing between electrodes 3 and 4, and $w$ the size of the cross-section of the active region between the two electrodes building up the gate.

Also according to the applicant's views, the critical field in the semi-conductor material used must be lower than the internal avalanche field. This implies a certain selection of this material: germanium and silicon are among the suitable substances. The main semi-conductive material, i.e. region 1 of FIG. 1 will preferably be the one wherein the limit speed of the carriers is the greatest, if a maximum operating frequency is desired.

The various conditions mentioned above must be determined for each particular case; a few examples are given herein below.

*Example 1*

A germanium region 1 of the N type, having a resistivity $\rho=15$ ohms/cm., is used. The optimum dimensions of the structure, as shown in FIG. 1, are approximately as follows:

$$D=2 \text{ mm.}$$
$$l=30\mu$$

$l$ being the width of the gate electrode;

$$w=60\mu$$

to obtain:

$I_{max}$=180 ma.
$V_{saturation}$=10 v.

and transconductance $g$=3 ma./v. for the control gate.

*Example 2*

With $\rho$=5Ω/cm.

$I_{max}$=300 ma.
$V_{saturation}$=10 v.
$g$=6 ma./v.

with $D$=2 mm.
$l$=30μ
$w$=30μ

*Example 3*

With $\rho$=5Ω/cm.:

$I_{max}$=250 ma.
$V_{saturation}$=18 v.
$g$=5 ma./v.

with $D$=2 mm.
$l$=90μ
$w$=30/μ

In the three examples given above, the maximum frequency is between 150 and 250 mc./s.

*Example 4*

A silicon structure according to FIG. 4, to be described later, wherein:

D=3 mm.
$l$=40μ
$w$=10μ
$\rho$=10Ω-cm.

may have the following characteristics:

$I_{max}$=50 ma.
$V_{saturation}$=4 v.
$g$=5 ma./v.

*Example 5*

Figure 4:
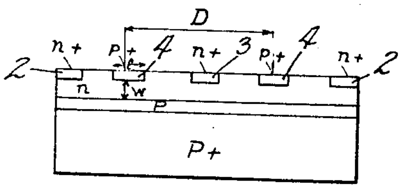
FIG. 4 represents a field-effect transistor, obtained by resorting to the so-called epitaxial method.

A silicon structure according to FIG. 4, wherein:

$D$=3 mm.
$l$=20μ
$w$=10μ
$\rho$=10Ω-cm.

may have the following characteristics:

$I_{max}$=70 ma.
$V_{saturation}$=3 v.
g=6 ma./v.

Figure 2:
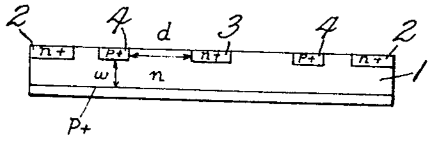
FIGS. 2 and 3 illustrate a field-effect transistor obtained by means of a diffusion method.

The field-effect structure illustrated in FIGS. 2 and 3 may be obtained as follows:

On one face of disc 1 of an N type semiconductor, a layer P+ is formed by diffusion of a suitable impurity. This layer, which in FIG. 2, is shown on the lower face of the disc, covers completely this face and corresponds to gate 5 of FIG. 1.

Figure 3:
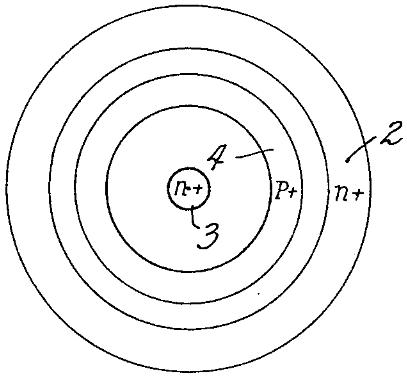

On the upper face of disc 1, by means of a known method using screens, rings 2, 3 and 4 are formed by diffusion as shown in FIG. 3. They are of the type indicated in FIG. 2.

The method of producing field-effect transistors by diffusion is known in the art; the novel feature of the invention consists in that $d>w/2$ and in that the gate ring 4 of ($p$+) material is formed in the body of the semiconductor disc 1, so that the section $w$ has a substantially smaller size than the adjoining sections of the disc, thus producing the sudden sectional discontinuity hereinabove.

It should be noted that one of the two gate junctions may be formed by the known method of forming surface barriers.

The field-effect structure shown in FIG. 4 is built up by a disc of the $p$+ type silicon, the upper face of which is covered by a $p$ type layer, diffused by heating from a $p$+ material. The layer, which forms one of the gate electrodes, is itself covered with an $n$ type layer obtained by the known epitaxial method.

As is known, this method consists in applying silicon (or some semiconductor material) to the point where the deposit is to be effected, causing the formation of a gaseous composition by means of a balanced reaction which is reversible with temperature.

For example, a silicon iodide is formed and the decomposition of this gas at the level of the layers to be deposited and the resulting production of silicon, is obtained by establishing a suitable temperature at the level of said layers and by masking in part, when necessary, the semiconductor surface to delimit said layers.

This is necessary, in the case considered, for depositing layer $n$, the annular gate electrode of type $p$+ being diffused.

The lower layer $p$+ merely serves as a support and a source of diffusion into layer $p$.

The epitaxial method makes it possible to obtain active elements of the structure having particularly small dimensions, which is of great interest at higher frequencies. With respect to the arrangement described in FIG. 3, the layer $n$, obtained by epitaxy, has a uniform concentration in donor atoms.

Figure 5:
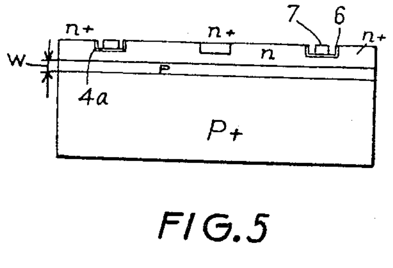
FIG. 5 illustrates a field-effect transistor wherein the annular gate electrode comprises a layer of dielectric material.

In the modification shown in FIG. 5, layers $p$+, $p$ and $n$ and electrodes $n$+ are obtained in the same way as in FIG. 4, except for the annular gate electrode, which is obtained in the following manner:

Layer $n$ is first cut out by electrolysis and, in the bottom of the annular groove 4 thus formed, there is deposited a layer 6 of silicon oxide or other dielectric material, the thickness of which is, for example, of the order $w/100$, a metallic electrode 7 being then deposited on the silicon or other dielectric, as selected.

The structure obtained in this alternative embodiment is highly advantageous, since the annular gate electrode is built up by a layer of dielectric material, such as, for example, silicon oxide, rather than by a junction. This layer causes to vary the potential in the active region which, according to the views set forth hereinabove, is necessary for the correct operation of the field effect transistor.

This alternative embodiment provides field-effect transistors having a particularly high input impedance.

It is to be understood that various modifications may be brought to the structure described and illustrated, without departing from the spirit and scope of the invention.

In particular, it is possible to incorporate in a single structure the various types of gates used in the different structures described i.e. dielectric gates, gates with a surface barrier, diffused junction gates, or gates comprising a junction obtained by the epitaxis method.

What is claimed, is:

1. A field effect transistor comprising a semiconductor body of one conductivity type having first and second parallel planar sides, an annular ring of opposite conductivity type recessed within the plane of said first side, source and drain electrodes mounted on said first side, concentrically disposed about said ring, a gate electrode mounted on said ring for providing space charge modulation within said semiconductor body, a region of opposite conductivity type formed on said second side to provide for space charge bias control, and wherein the spacing between said drain and gate electrodes is greater than half the width of the semiconductor body between the areas of opposite conductivity type.

2. A transistor, as in claim 2, where said region of opposite conductivity type is an annular ring formed on said second side coaxially disposed with respect to said annular ring.

3. A gate insulated, field effect transistor comprising: a substrate of one conductivity type, a region of said one conductivity type formed in one side of said substrate, an epitaxial layer of opposite conductivity type formed on said region and defining the channel region of said transistor, an annular recess formed in said layer, a layer of electrically insulating material formed in said recess, a gate electrode deposited on said insulating material thereby forming said insulated gate, annular concentric source and drain electrodes disposed on said epitaxial layer about the insulated gate, whereby the thickness of said epitaxial layer along said gate electrode is less than any other section.

References Cited by the Examiner

UNITED STATES PATENTS

| | | | |
|---|---|---|---|
| 2,648,805 | 8/1953 | Spenke et al. | 317—234 |
| 2,754,431 | 7/1956 | Johnson | 317—235 |
| 2,778,956 | 1/1957 | Dacey et al. | 317—235 |
| 2,952,804 | 9/1960 | Franke | 317—235 |
| 2,994,811 | 8/1961 | Senitzky | 317—235 |
| 3,001,111 | 9/1961 | Chappey | 317—235 |
| 3,010,033 | 11/1961 | Noyce | 317—235 |
| 3,081,421 | 3/1963 | Roka | 317—235 |
| 3,089,794 | 5/1963 | Marinace | 317—235 |
| 3,114,867 | 12/1963 | Szekely | 317—235 |
| 3,126,505 | 3/1964 | Shockley | 317—235 |
| 3,152,294 | 10/1964 | Siebertz et al. | 317—235 |
| 3,191,061 | 6/1965 | Weimer | 317—235 |
| 3,201,665 | 8/1965 | Venables | 317—235 |

FOREIGN PATENTS

| | | |
|---|---|---|
| 1,037,293 | 9/1953 | France. |

JOHN W. HUCKERT, *Primary Examiner.*

J. D. CRAIG, J. D. KALLAM, C. E. PUGH, *Assistant Examiners.*